(12) United States Patent
Deitch

(10) Patent No.: US 7,827,021 B2
(45) Date of Patent: *Nov. 2, 2010

(54) SYSTEM FOR MODELING LPAR BEHAVIORS IN A SIMULATION TOOL

(75) Inventor: Martin Deitch, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/420,509

(22) Filed: Apr. 8, 2009

(65) Prior Publication Data

US 2009/0192779 A1    Jul. 30, 2009

Related U.S. Application Data

(63) Continuation of application No. 10/789,262, filed on Feb. 27, 2004, now Pat. No. 7,526,421.

(51) Int. Cl.
  G06F 9/44 (2006.01)
  G06F 3/00 (2006.01)
  G06F 5/00 (2006.01)
  G06F 9/00 (2006.01)
  G06F 15/173 (2006.01)
  G06F 9/46 (2006.01)

(52) U.S. Cl. .................. 703/21; 710/5; 710/8; 710/36; 713/1; 709/226; 718/104

(58) Field of Classification Search ................ 703/21; 710/5, 8, 36; 713/1; 709/226; 718/104
See application file for complete search history.

(56) References Cited

U.S. PATENT DOCUMENTS 5,253,344 A * 10/1993 Bostick et al. ................ 710/8

(Continued)

FOREIGN PATENT DOCUMENTS

EP    0593874 A3    4/1994

OTHER PUBLICATIONS

Rooney et al. 'Intelligent Resource Director'. IBM Research and Development vol. 46 No. 4/4. Jul./Sep. 2002.*

(Continued)

*Primary Examiner*—Kamini S Shah
*Assistant Examiner*—Shambhavi Patel
(74) *Attorney, Agent, or Firm*—Douglas Lashmit; Hoffman Warnick LLC

(57) ABSTRACT

A simulation tool for modeling LPAR behavior in a mainframe computer. The simulation tool comprises: a system for calculating a resource percentage, wherein the resource percentage represents a percentage of total resources allocated to the LPAR, wherein the resource percentage is equal to: 100%−a percentage of resources allocated to all other LPARs running in the simulated computer; a system for calculating a time slice percentage for the LPAR based on the resource percentage and CP (central processor) data, wherein: time slice percentage=((resource percentage)×(# of physical CPs))/(# of logical CPs); a system for determining a CP (central processor) percentage, wherein the CP percentage represents a percentage of time that all physical CPs in the computer being modeled have been allocated to the LPAR; a system for determining causing the computer simulation not to dispatch CPs to the LPAR for a current modeling interval if the CP percentage is greater than the time slice percentage; and a system for outputting and displaying the behavior of the modeling.

6 Claims, 3 Drawing Sheets

U.S. PATENT DOCUMENTS

| | | | |
|---|---|---|---|
| 5,615,357 A | 3/1997 | Ball | |
| 5,668,995 A | 9/1997 | Bhat | |
| 5,784,702 A | 7/1998 | Greenstein et al. | |
| 5,881,268 A | 3/1999 | McDonald et al. | |
| 6,006,027 A | 12/1999 | Downey et al. | |
| 6,232,972 B1 | 5/2001 | Arcuri et al. | |
| 6,530,078 B1 * | 3/2003 | Shmid et al. | 717/138 |
| 6,574,587 B2 * | 6/2003 | Waclawski | 702/186 |
| 6,606,585 B1 | 8/2003 | Borowsky et al. | |
| 6,622,221 B1 | 9/2003 | Zahavi | |
| 6,912,493 B1 * | 6/2005 | Scheel et al. | 703/2 |
| 6,957,435 B2 * | 10/2005 | Armstrong et al. | 718/104 |
| 6,986,137 B1 * | 1/2006 | King et al. | 718/104 |
| 7,007,276 B1 * | 2/2006 | Kubala et al. | 718/104 |
| 7,051,188 B1 * | 5/2006 | Kubala et al. | 712/29 |
| 7,062,642 B1 * | 6/2006 | Langrind et al. | 713/1 |
| 7,096,469 B1 * | 8/2006 | Kubala et al. | 718/100 |
| 7,266,823 B2 * | 9/2007 | Alford, Jr. | 718/104 |
| 7,370,331 B2 * | 5/2008 | Brenner | 718/107 |
| 7,428,485 B2 * | 9/2008 | Armstrong et al. | 703/21 |
| 7,565,398 B2 * | 7/2009 | Ashok et al. | 709/203 |
| 7,620,950 B2 * | 11/2009 | Mathias et al. | 718/100 |
| 2001/0013008 A1 | 8/2001 | Waclawski | |
| 2001/0016808 A1 | 8/2001 | Shaar | |
| 2002/0116441 A1 | 8/2002 | Ding et al. | |
| 2003/0139917 A1 | 7/2003 | Hardwick et al. | |
| 2003/0200059 A1 | 10/2003 | Ignatowski et al. | |
| 2003/0212884 A1 * | 11/2003 | Lee et al. | 713/1 |
| 2004/0221290 A1 * | 11/2004 | Casey et al. | 718/104 |
| 2005/0044228 A1 * | 2/2005 | Birkestrand et al. | 709/226 |

OTHER PUBLICATIONS

Kyne et al. 'z/OS Intelligent Resource Director'. Aug. 2001.*
Buttlar, J von. "z/CECSIM: An Efficient and Comprehensive Microcode Simulator for the IBM eServer z900" 2002.*
Buttlar, J. von., "z/CECSIM: An Efficient and Comprehensive Microcode Simulator for the IBM eServer z900", IBM Journal of Research and Development, Jul./Sep. 2002.
Rooney, et al., "Intelligent Resource Director", IBM Journal of Research and Development, vol. 46, No. 4/5, Jul./Sep. 2002.
Kyne, et al., "z/OS Intelligent Resource Director", Copyright 2001, IBM Corp.
Petrini, et al., "Scheduling with Global Information in Distributed Systems", 20th International Conference on Distributed Computing Systems, Apr. 10-13, 2000 Taipei, Taiwan.

* cited by examiner

SYSTEM FOR MODELING LPAR BEHAVIORS IN A SIMULATION TOOL

The current application is a continuation of the U.S. patent application Ser. No. 10/789,262, filed on Feb. 27, 2004, now U.S. Pat. No. 7,526,421 and hereby incorporated by reference.

BACKGROUND OF THE INVENTION

1. Technical Field

The present invention relates generally to simulation tools for mainframe computers, and more specifically relates to a system for modeling LPAR behaviors within a mainframe simulation tool.

2. Related Art

A logical partition (LPAR) is the division of a computer's processors, memory and storage into multiple sets of resources so that each set of resources can be operated independently with its own operating system instance and applications. The number of logical partitions that can be created depends on the system's processor model and resources available. Typically, partitions are used for different purposes such as database operation or client/server operation or to separate test and production environments. Each partition can communicate with the other partitions as if the other partition is in a separate machine. Both of IBM's® z/OS and AS/400 products support logical partitioning. HITACHI® and SUN MICROSYSTEMS® also use forms of logical partitioning.

Often it is necessary to model the performance of mainframe systems utilizing LPARs, e.g., to meet customer needs, etc. Unfortunately, current modeling techniques do not account for various LPAR behaviors. One such behavior involves time slice dispatching, which occurs when the total processor consumption nears 100%. Time slice dispatching, as opposed to event dispatching, refers to the way physical CPs (central processors or central processing units) are dispatched to logical CPs by the dispatcher. Because time slice dispatching has an impact on the workload performance of the system, it must be accounted for.

Another behavior involves the interaction of several LPARs running on the same processor. In an LPAR mode configuration, the performance of workloads running in one LPAR can be heavily affected by the work running in other LPARs. This is especially true when the total utilization of the processor approaches 100%. Since known simulators generally only model the workloads in one LPAR at one time, the workloads running in the other LPARs are defined as a constant amount of capacity (i.e., some number of MIPS). However, this assumes the amount of capacity used by these other LPARs is fixed or constant. In real systems, the amount of capacity used by these other LPARs is variable and is a function of the capacity used by the LPAR being modeled.

Accordingly, a need exists for a simulation tool that can better model LPAR behaviors.

SUMMARY OF THE INVENTION

The present invention addresses the above-mentioned problems, as well as others by providing a simulation tool that can model LPAR behaviors associated with operating in time slice dispatch mode and running multiple LPARs. In a first aspect, the invention provides a computer simulation tool having a tool for simulating operation of a computer having a system for modeling a behavior of an LPAR operating in a time slice dispatch mode, the system comprising: a system for calculating a resource percentage, wherein the resource percentage represents a percentage of total resources allocated to the LPAR; a system for calculating a time slice percentage for the LPAR based on the resource percentage; a system for determining a CP percentage, wherein the CP percentage represents a percentage of time that all physical CPs in the computer being modeled have been allocated to the LPAR; and a system for determining causing the computer simulation not to dispatch CPs to the LPAR for a current modeling interval if the CP percentage is greater than the time slice percentage.

In a second aspect, the invention provides a program product stored on a recordable medium for modeling a behavior of an LPAR (logical partition) in a simulated computer operating in a time slice dispatch mode, comprising: means for calculating a resource percentage, wherein the resource percentage represents a percentage of total resources allocated to the LPAR; means for calculating a time slice percentage for the LPAR based on the resource percentage; means for determining a CP percentage, wherein the CP percentage represents a percentage of time that all physical CPs in the computer being modeled have been allocated to the LPAR; and means for determining causing the simulated computer not to dispatch CPs to the LPAR for a current modeling interval if the CP percentage is greater than the time slice percentage.

In a third aspect, the invention provides a method for modeling workload performance of a plurality of LPARs (logical partitions) in a computer simulation, comprising: providing a model for each LPAR specified in the computer simulation, wherein each model includes a defined consumption that is dependent on a consumption of the other LPARs; initializing the defined consumption for each model; running each model and determining an observed consumption for each model; comparing the observed consumption with the defined consumption for all of the models; for each model that has an observed consumption that does not agree with the defined consumption, feeding back the observed consumption to the other models; adjusting the defined consumption of each model based on the feedback; and iteratively rerunning each model until the observed consumption agrees with the defined consumption for each model.

In a fourth aspect, the invention provides a computer simulation tool for modeling workload performance of a plurality of LPARs (logical partitions), comprising: a system for building a model for each LPAR specified in the computer simulation, wherein each model includes a defined consumption that is dependent on a consumption of the other LPARs; a system for running each model and determining an observed consumption for each model; a system for comparing the observed consumption with the defined consumption for all of the models; a system for feeding back the observed consumption to the other models from each model that has an observed consumption that does not agree with the defined consumption; a system for adjusting the defined consumption of each model based on the observed consumption feedback; and a system for iteratively rerunning each model until the observed consumption agrees with the defined consumption for each model.

In a fifth aspect, the invention provides a program product stored on a recordable medium for modeling workload performance of a plurality of LPARs (logical partitions), comprising: means for specifying a model for each of a plurality of LPARs, wherein each model includes a defined consumption that is dependent on a consumption of the other LPARs; means for running each model and determining an observed consumption for each model; means for comparing the observed consumption with the defined consumption for all of the models; means for feeding back the observed consumption to the other models from each model that has an observed consumption that does not agree with the defined consumption; means for adjusting the defined consumption of each model based on the observed consumption feedback; and means for iteratively rerunning each model until the observed consumption agrees with the defined consumption for each model.

In a sixth aspect, the invention provides a computer simulation tool for modeling LPAR behavior, comprising: a first algorithm for modeling the behavior of an LPAR (logical partition) operating in a time slice dispatch mode; and a second algorithm for modeling the behavior of a plurality of LPARs.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
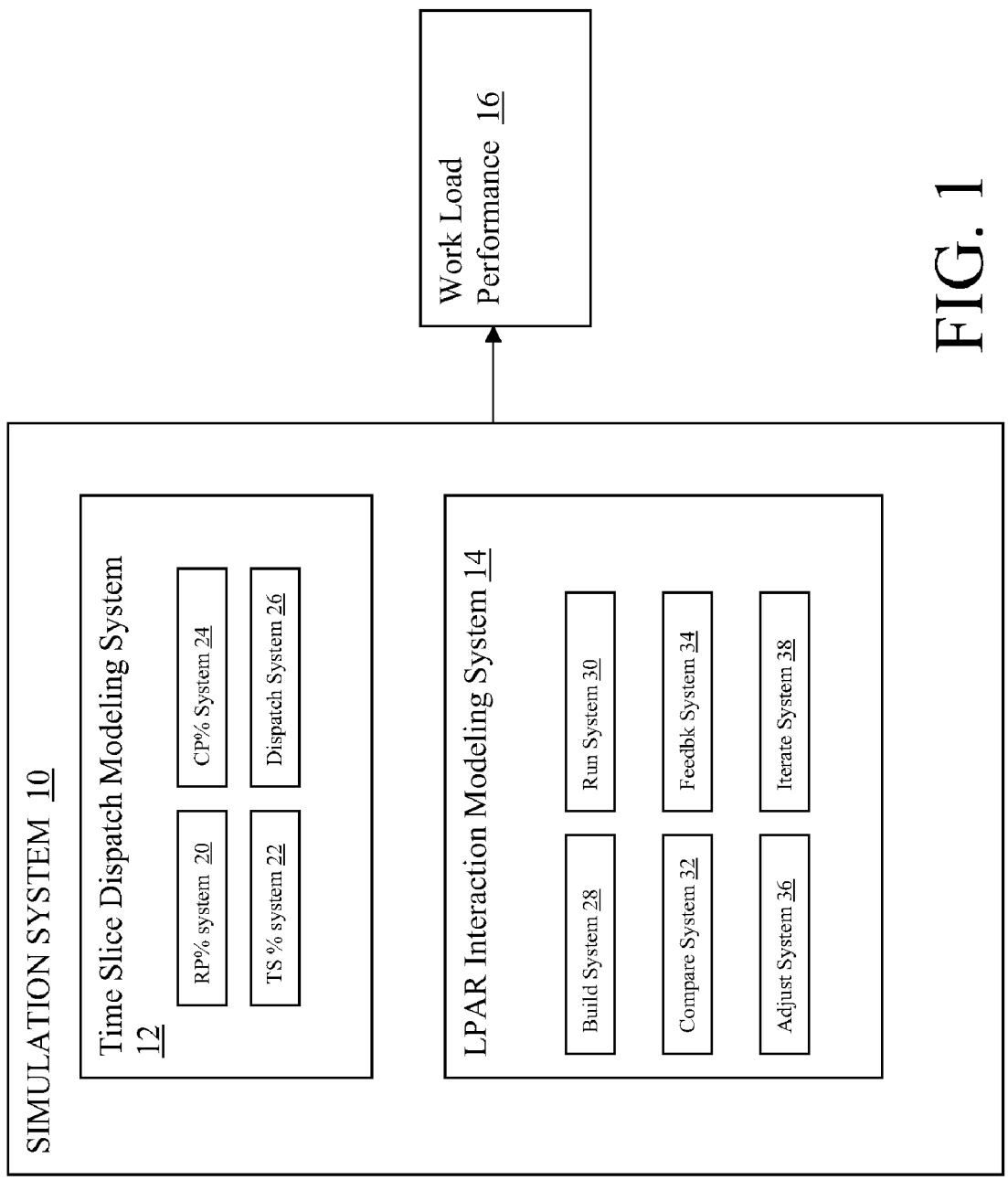
FIG. 1 depicts a simulation system in accordance with an embodiment of the present invention.

Referring now to drawings, FIG. 1 depicts a simulation system 10 for simulating the operation of an LPAR-based computer system. Simulation system 10 includes two LPAR modeling systems 12 and 14, which model LPAR behavior that commonly occurs in two different situations in order to provide an accurate workload performance 16. As noted above, LPARs (logical partitions) are utilized in various mainframe computers, including IBM® z/OS and AS/400 products, as well as HITACHI® and SUN MICROSYSTEMS® products.

Time slice dispatch modeling system 12 models the behavior of an LPAR when the computer simulation operates in a time slice dispatch mode, which occurs when the total processor consumption nears 100%. Time slice dispatch modeling system 12 includes various systems that operate at the beginning of each modeling run. These systems include:

1. A first system 20 for calculating a resource percentage, wherein the resource percentage represents a percentage of total resources allocated to the LPAR. The resource percentage (RP %) is calculated as follows, RP %=100%−(sum of resources, by percent, that can be used by each of the other LPARs).

The percentage of resources that can be used by the other LPARS may be based on at least three values: (1) a weighting factor, 0-100%, specified for each LPAR; (2) the number of logical CPs allocated to each LPAR; and (3) the MIPs value for each LPAR.

2. A second system 22 for calculating a time slice percentage for the LPAR based on the resource percentage. The time slice percentage provides a percentage of time that a physical CP (central processor) must be allocated to a logical CP (central processor) for an LPAR to guarantee that the physical CP can meet its minimum share of the total processor capabilities. The time slice percentage (TS %) is calculated as follows:

$$TS\ \% = \frac{RP\ \% \times (\#\ of\ physical\ CPs)}{(\#\ of\ logical\ CPs)}$$

3. A third system 24 for determining a CP percentage (CP %) for the LPAR, wherein the CP percentage represents a percentage of time that all physical CPs in the computer being modeled have been allocated to the LPAR.

4. A fourth system 26 for causing the computer simulation not to dispatch CPs to the LPAR for a current modeling interval if the CP percentage is greater than the time slice percentage. A more detailed explanation of the overall process is described below with reference to FIG. 2.

The second modeling system, LPAR interaction modeling system 14, provides workload performance for the case when a plurality of LPARs is modeled by simulation system 10. Because all LPARs consume resources, all LPARs must be taken into account when modeling the workload performance of each individual LPAR. LPAR interaction modeling system 14 includes the following systems:

1. A first system 28 for building a model for each LPAR specified in the computer simulation, wherein each model includes a defined consumption value that is dependent on a consumption of the other LPARs. The defined consumption value may, for example, be defined by a MIPs parameter associated with each LPAR. The initial consumption value for each LPAR is assumed to be a constant value.

2. A second system 30 for running each model separately and determining an observed consumption for each model.

3. A third system 32 for comparing the observed consumption with the defined consumption for all of the models, (e.g., in MIPs). If the two values fall within a predetermined threshold (e.g., 1.25%), then the two values agree.

4. A fourth system 34 for feeding the observed consumption back to the other models from each model that has an observed consumption that does not agree with the defined consumption.

5. A fifth system 36 for adjusting the defined consumption of each model using the observed consumption feedback. Thus, all other models will correctly reflect the observed value for a given LPAR.

6. A sixth system 38 for iteratively rerunning each model until the observed consumption agrees with the defined consumption for each model. This ensures that the interaction of each LPAR with the other LPARs is correctly modeled. A more detailed explanation of the process is described below with reference to FIG. 3.

Figure 2:
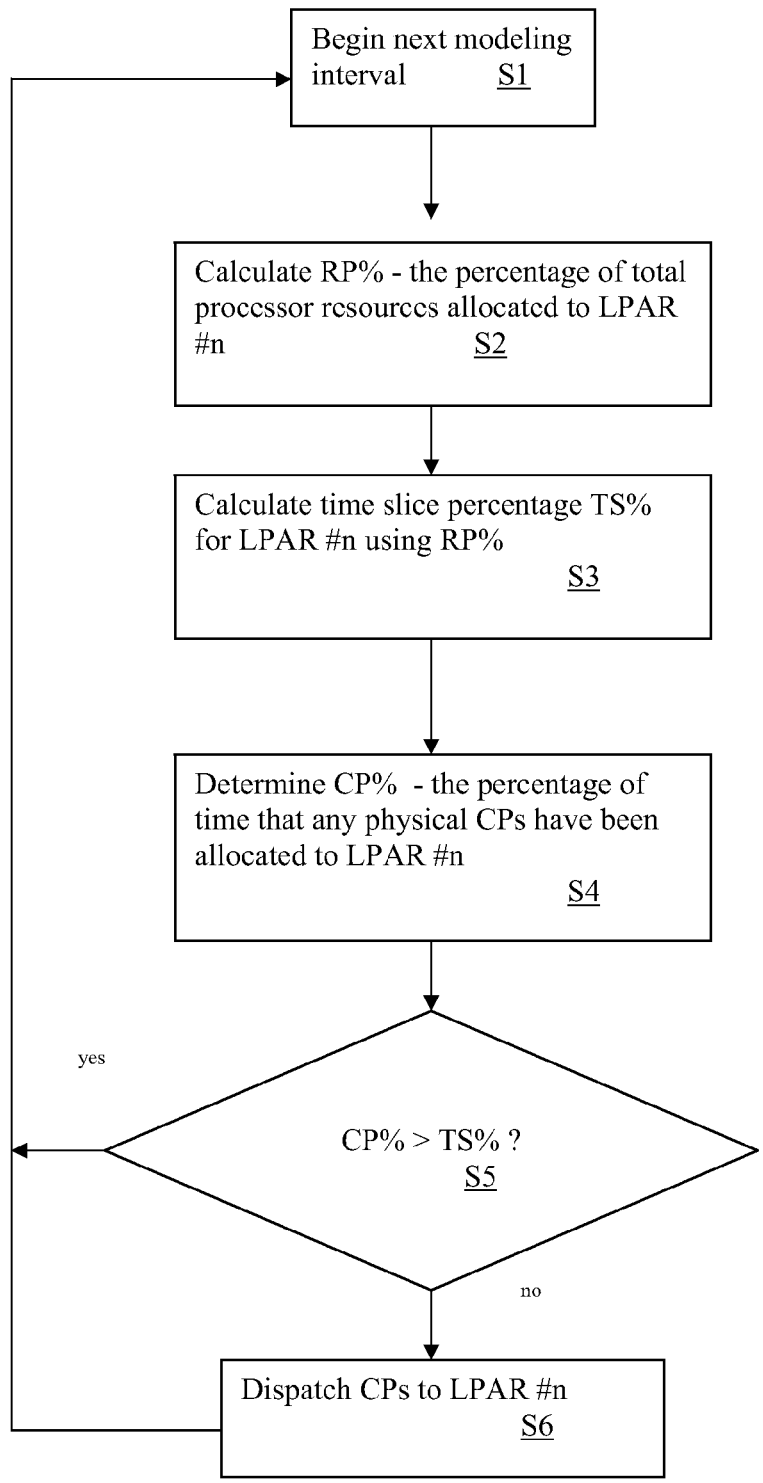
FIG. 2 depicts a flow diagram of a method for modeling a behavior of an LPAR in a computer simulation operating in a time slice dispatch mode in accordance with an embodiment of the present invention.

Referring now to FIG. 2, a flow chart is shown depicting a method for modeling a behavior of an LPAR in a computer simulation operating in a time slice dispatch mode. A next modeling interval begins at step S1. A modeling interval may for example occur at ever 1/100 of a second. At step S2, the resource percentage (RP %) is calculated, wherein the resource percentage represents a percentage of total resources allocated to the LPAR. At step S3, the time slice percentage TS % for the LPAR is calculated based on the resource percentage. At step S4, the CP percentage (CP %) is determined, which represents a percentage of time that all physical CPs in the computer being modeled have been allocated to the LPAR. CP percentage can be readily obtained from the simulation system 10 in a manner known in the art.

At step S5, a check is made to determine whether the CP percentage (CP %) is greater than the time slice percentage (TS %). If it is greater, no CPs are dispatched to the LPAR for the next modeling interval. If CP % is not greater than TS %, then CPs are dispatched to the LPAR at step S6 for the next modeling interval.

Figure 3:
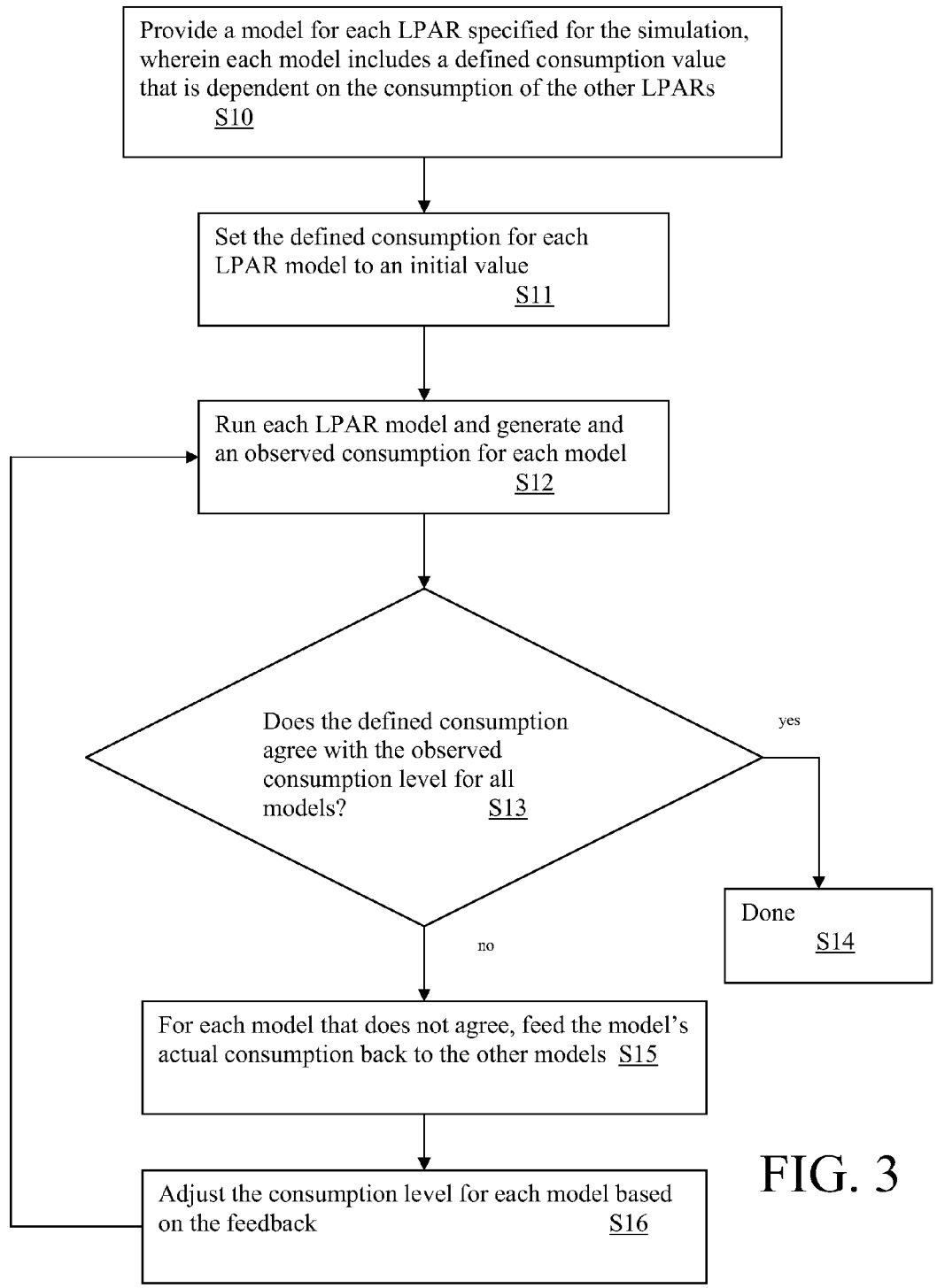
FIG. 3 depicts a flow diagram of a method for modeling workload performance of a plurality of LPARs in a computer simulation in accordance with an embodiment of the present invention.

Referring now to FIG. 3, a flow chart is shown depicting a method for modeling workload performance of a plurality of LPARs. At step S10, a model is provided for each LPAR specified in the simulation, wherein each model includes a defined consumption (e.g., MIPs) value that is dependent on the consumption of the other LPARs. At step S11, the defined consumption is set to an initial constant value for each LPAR. Any method may be used for selecting the initial value. At step S12, each LPAR model is run separately, and an observed consumption is determined for each model. At step S13, a check is made to see if the defined consumption agrees with the observed consumption for each of the models. If the two values are in agreement (i.e., within some predetermined threshold) for each model, then the simulation is complete at step S14.

If one of more of the models have observed/defined consumption values not in agreement, then the observed consumption value for each model not in agreement is fed to all of the other models. Thus, if there are five models M1, M2, M3, M4 and M5, and the observed consumption values for models M1 and M3 do not agree with their respective defined consumption values, then the observed consumption from M1 is fed to M2, M3, M4 and M5, and the observed consumption from M3 is fed to M1, M2, M4 and M5.

Then, at step S16, the defined consumption level for each model is adjusted based on the observed consumption values received from the other models. The method then loops back to step S12, where each LPAR model is rerun, and the process is iteratively repeated until the defined consumption agrees with the observed consumption for all of the models.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A tool for simulating operation of a computer having a system for modeling a behavior of an LPAR operating in a time slice dispatch mode, the modeling system comprising:
    a system for calculating a resource percentage, wherein the resource percentage represents a percentage of total resources allocated to the LPAR, wherein the resource percentage is equal to: 100%−a percentage of resources allocated to all other LPARs running in the simulated computer;
    a system for calculating a time slice percentage for the LPAR based on the resource percentage and CP (central processor) data, wherein:

$$\text{time slice percentage} = \frac{(\text{resource percentage}) \times (\text{\# of physical } CPs)}{(\text{\# of logical } CPs)};$$

a system for determining a CP (central processor) percentage, wherein the CP percentage represents a percentage of time that all physical CPs in the computer being modeled have been allocated to the LPAR;
    a system for determining causing the computer simulation not to dispatch CPs to the LPAR for a current modeling interval if the CP percentage is greater than the time slice percentage; and
    a system for outputting and displaying the behavior of the modeling.

2. The tool of claim 1, wherein the percentage of resources allocated to all other LPARs is based on a weighting factor specified for each LPAR, a number of logical CPs allocated to each LPAR, and a MIPs (million instructions per second) value for each LPAR.

3. The tool of claim 2, wherein the MIPs value represents a maximum consumption that each LPAR could consume in an unrestrained processor.

4. A program product stored on a computer readable medium for modeling a behavior of an LPAR (logical partition) in a simulated computer operating in a time slice dispatch mode, comprising:
    means for calculating a resource percentage, wherein the resource percentage represents a percentage of total resources allocated to the LPAR, wherein the resource percentage is equal to: 100%−a percentage of resources allocated to all other LPARs;
    means for calculating a time slice percentage for the LPAR based on the resource percentage and CP (central processor) data, wherein:

$$\text{time slice percentage} = \frac{(\text{resource percentage}) \times (\text{\# of physical } CPs)}{(\text{\# of logical } CPs)};$$

means for determining a CP (central processor) percentage, wherein the CP percentage represents a percentage of time that all physical CPs in the computer being modeled have been allocated to the LPAR;

means for determining causing the computer simulation not to dispatch CPs to the LPAR for a current modeling interval if the CP percentage is greater than the time slice percentage; and means for outputting and displaying the behavior of the modeling.

5. The program product of claim 4, wherein the percentage of resources allocated to all other LPARs is based on a weighting factor specified for each LPAR, a number of logical CPs allocated to each LPAR, and a MIPs (million instructions per second) value for each LPAR.

6. The program product of claim 5, wherein the MIPs value represents a maximum consumption that each LPAR could consume in an unrestrained processor.

* * * * *